United States Patent [19]

Biondo

[11] 4,023,715
[45] May 17, 1977

[54] MEASURING AND DISPENSING DEVICE

[75] Inventor: Joseph G. Biondo, Watchung, N.J.

[73] Assignee: Engelhard Minerals & Chemicals Corporation, Murray Hill, N.J.

[22] Filed: Sept. 2, 1975

[21] Appl. No.: 609,283

[52] U.S. Cl. .................................... 222/307
[51] Int. Cl.² ............................... G01F 11/10
[58] Field of Search ............ 222/304–308, 222/438, 440

[56] References Cited

UNITED STATES PATENTS

| | | | |
|---|---|---|---|
| 357,734 | 2/1887 | Prangley | 222/306 X |
| 774,326 | 11/1904 | Kelly | 222/306 X |
| 2,081,544 | 5/1937 | Krivig | 222/308 X |
| 2,898,009 | 8/1959 | Green | 222/308 |
| 3,028,051 | 4/1962 | Jacobs | 222/440 |

Primary Examiner—Robert B. Reeves
Assistant Examiner—David A. Scherbel

[57] ABSTRACT

A body member has an internally screw-threaded socket or recess to receive the neck of a container, and a port adapted in one position to communicate with a transverse passage or measuring chamber in a slidable measuring and dispensing member which is movable into another position wherein the measuring chamber communicates with a discharge passage in the body. A spring biased valve member is slidable within an axial bore in the measuring and dispensing member and is under control of a slidable cam abutting the valve member, the cam being assembled in a slot in the measuring and dispensing member and held there by a stop member rotatably mounted on the end of the measuring and dispensing member.

8 Claims, 5 Drawing Figures

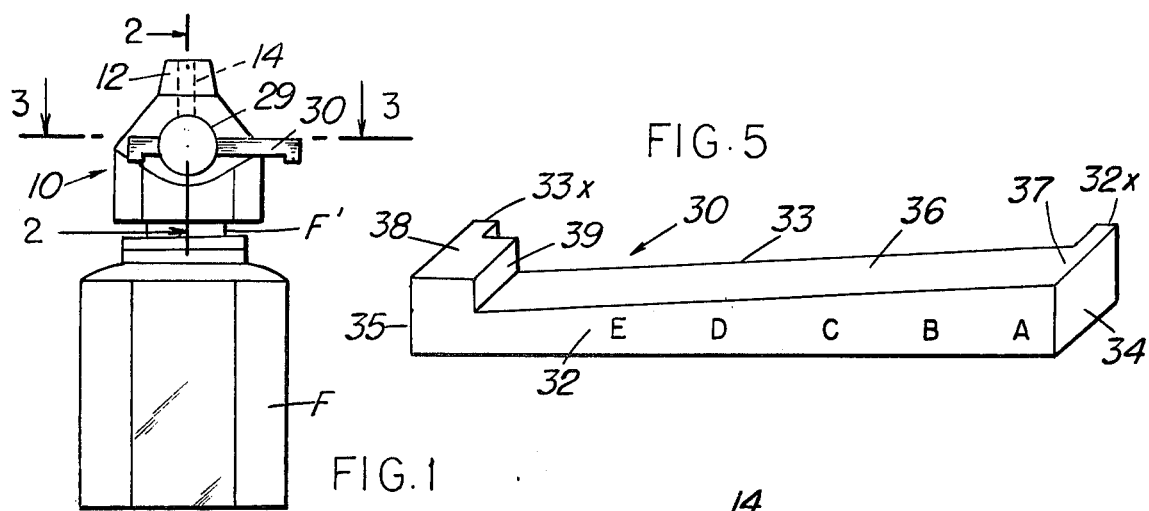
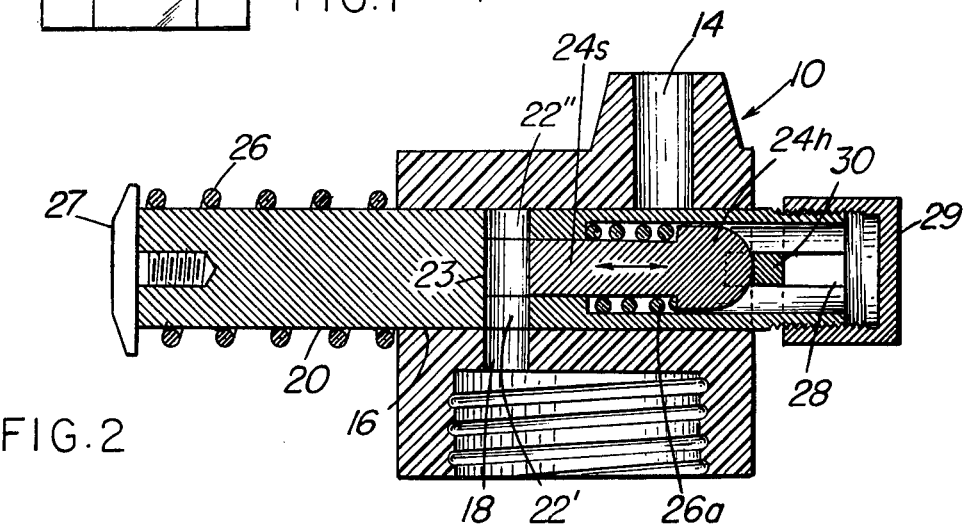
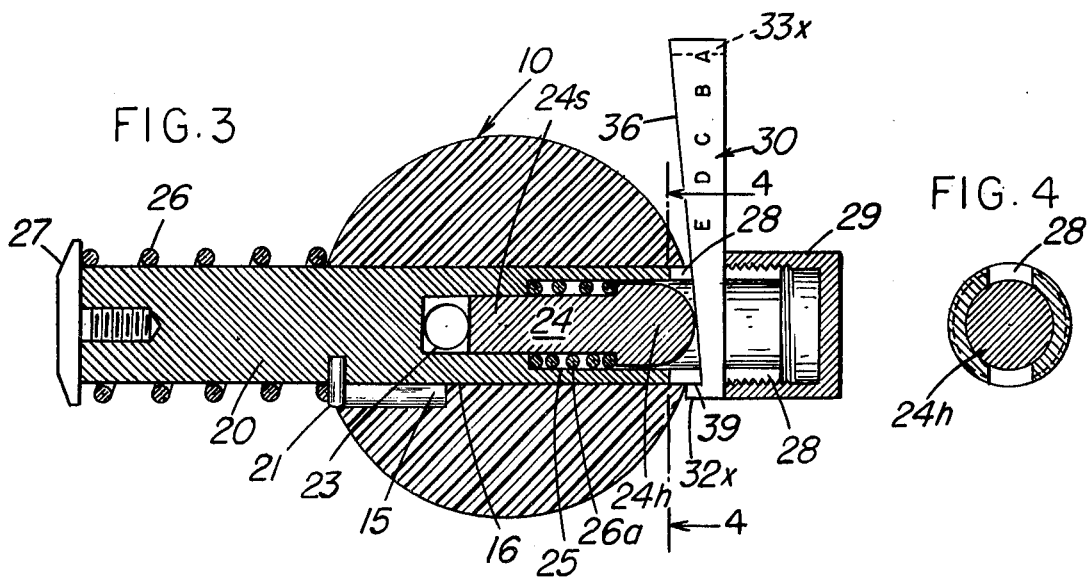

MEASURING AND DISPENSING DEVICE

This invention relates to devices for measuring and dispensing flowing materials, for example, powdered, granular or liquid substances. More particularly, the invention relates to measuring and dispensing of granular alloy or metal and mercury which are used in making fillings for teeth.

Some new dental alloys require less mercury for their use. In consequence, more precise measurement and control of the quantity of mercury is required than was feasible with prior measuring and dispensing devices.

Moreover, changes in the proportions of the materials are necessary from time to time, such as to provide a dry or wet mixture of alloy and mercury, i.e., mixtures containing smaller or larger amounts of mercury, respectively.

PRIOR ART

In a known prior device, disclosed in the patent of S.J. Krivig U.S. Pat. No. 2,081,544, upon which the present invention is an improvement, a slidable dispensing member has a measuring chamber normally communicating with an inlet port for material to be measured and dispensed. On sliding the dispensing member, the chamber is moved to communicate with a discharge port. The amount of material in the measuring chamber may be varied by a screw-threaded rod adjustable axially in position along the slidable dispensing member to cause its end to enter the chamber to vary the volume of the chamber. But this device requires internal and external screw-threading of parts for adjustment of the valve member and does not provide the desired precision and control of the amount of material dispensed.

Therefore, it is an object of the invention to provide an adjustable measuring device and dispenser, for flowing materials in general and mercury in particular, which will more accurately and precisely measure a preselected amount than heretofore.

Another object is to provide a device as aforesaid which may be produced at lower manufacturing cost than heretofore.

Other objects and advantages of the invention will appear as the invention is described in connection with the accompanying drawings.

SUMMARY OF THE INVENTION

According to the invention, a body member has an internally screw-threaded socket or recess to receive the neck of a container, and a port adapted in one position to communicate with a transverse passage or measuring chamber in a slidable measuring and dispensing member which is movable into another position wherein the measuring chamber communicates with a discharge passage in the body. A spring biased valve member is slidable within an axial bore in the measuring and dispensing member and is under control of a slidable cam abutting the valve member, the cam being assembled in a slot in the measuring and dispensing member and held there by a stop member rotatably mounted on the end of the measuring and dispensing member.

DESCRIPTION OF THE INVENTION

In the drawing:

FIG. 1 is a side elevational view of the invention mounted on a bottle.

FIG. 2 is an enlarged inverted cross-sectional view taken along line 2—2 of FIG. 1.

FIG. 3 is an enlarged inverted cross-sectional view taken along line 3—3 of FIG. 1.

FIG. 4 is a transverse sectional view taken along line 4—4 of FIG. 3.

FIG. 5 is a perspective view of the operating cam member used in the invention. Referring to the form illustrated in the drawing, a casing or body member 10, embodying the invention is mounted on a bottle or other container F. The body 10 which may be round at its lower or inner end converges upwardly from its midportion to a round top 12. Although a preferred exterior shape is shown, it will be understood that the body may have other suitable shape.

A cylindrical discharge port or passage 14 runs from the outer end of the top 12 inwardly toward the container F to connect with a cylindrical passageway 16, which extends transversely from one side of the casing 10 diametrically through to the other side.

Spaced along the passageway 16 from the discharge port 14 and extending in a diametrically opposite direction is a cylindrical inlet port or passage 18 opening into an internally threaded socket or recess in the body member 10 and adapted to receive the threaded neck F' of a glass bottle or similar container containing the material to be dispensed.

In the transverse passageway 16 is located a cylindrical measuring and dispensing member 20 having in the midportion thereof a measuring chamber consisting of one end of an axial bore 23 and cylindrical inlet and outlet openings 22', 22''. The openings 22', 22'' may be of the same circular cross-sectional area as the inlet and discharge ports 18 and 14 but preferably are of larger cross-sectional area, in order to take into account possible misalignment of the openings 22', 22'' with the ports 18 and 14, and to permit free movement of the mercury or other material.

The dispensing member 20 is slidable from one position to another, i.e., from a measuring to a discharge position. In the measuring position, the measuring chamber opening 22' registers, with the inlet port 18 to receive a measured amount or dosage of material from the container. As the member moves to the discharge position, it conveys the dosage to the discharge port wherein the chamber opening 22'' comes into register therewith.

In order to bias the dispensing member 20 normally into the measuring position, a coiled compression spring 26 is positioned around the dispensing member 20 between the casing 10 and the overlapping head of screw 27 in the end of the dispensing member 20.

In order to prevent rotation of the dispensing member 20, a radially extending pin 21 is mounted on the dispensing member in a position to lie within a longitudinally extending channel 15 formed in the passageway 16, in all positions of the dispensing member.

In order to vary the volume of the measuring chamber with great precision and accuracy, a movable valve member designated generally by numeral 24 is provided. The valve has a cylindrical stem 24s, which is slidably received in the axial bore 23 of the dispensing member 20. As shown, the diameter of the bore 23 is larger than the diameter of the inlet and outlet parts of the measuring chamber thus enlarging the central portion of the measuring chamber. The valve has a domeshaped head 24h which is located in an enlargement or counter-bore 25 at the outer end of the bore 23. As will be described, the inner end of the valve stem may be extended into the measuring chamber variable amounts to vary the dosage which the chamber can accept. The valve 24 is normally biased outwardly by a coiled compression spring 26a coiled around its stem and pressing at one end against the shoulder at the inner end of the counter-bore 25 and at its other end against the shoulder between the head 24h and stem 24s of the valve.

To regulate and adjust the position of the valve 24, a manually operable cam member 30 is slidably located in a diametrical slot 28 formed in the end of the dispensing member 20 adjacent the valve head. As shown in FIG. 5, the cam member 30 has flat parallel sides 32, 33, extending between parallel end faces 34, 35, and a longitudinal flat cam face extending transversely between the parallel sides 32, 33 and inclined between the ends 37, 38, thereby providing shoulder 39 at the end 38.

Under urge of spring 26a, the head 24h of the valve member is biased against the cam face 36. Movement of the cam member 30 in one direction is limited by a rib or small lateral extension 32x from the side 33 at the end 37. A similar rib 33x for a similar purpose is provided at the end 38 in extension of the side 33.

To hold the cam 30 in slot 28 in predetermined position, a cylindrical cap member 29 is internally threaded and screwed over the open end of the dispensing member 20 until the periphery or rim of the open end of the cap, pressing against the straight surface of the cam member locates the cam member and valve in the desired position, preferably where the inner end of the valve stem is tangential to the passages 22', 22'' in the dispensing member 20.

Preferably, the side face or faces of the cam member are marked with positions or calibrations such as A to E so that the dispensing member can be set for a desired dosage by reference to the calibrations. The device is accurate to ±1% when delivering between 288 and 403 milligrams of mercury.

In operation of the device, with the body 10 and bottle F upright, as shown in FIG. 1, the dispensing member 20 is slid to locate the measuring chamber 22 in register with the inlet port 18, and adjustment cam 30 is slid along the slot 28 into the position which will provide the desired dosage. The sliding action of the cam 32 moves the valve 24 axially, projecting its stem 24s into the chamber 22 the desired amount, thereby determining the amount of mercury or other material the chamber can receive. The device is then inverted and the dispensing member 20 is slid to place the measuring chamber in register with the discharge port 14 for discharge of the measured amount from the measuring chamber.

From the foregoing, it will be noted that the device is assembled from simple uncomplicated parts which can be inexpensively manufactured and easily assembled. Moreover, without the use of screw-threaded parts, variation of the volume of the measuring chamber can be quickly, easily and accurately made, whereby a device that is less expensive and more precise than heretofore is provided.

Modifications within the scope of the invention will occur to those skilled in the art. Therefore, the invention is not limited to the precise form and configuration disclosed.

What is claimed is:

1. In a device for measuring and dispensing flowing materials, a casing having an inlet port and a discharge port for inflow and discharge of the material, a measuring and dispensing member slidable in a passageway in said casing, said member having a longitudinally extending passage one end of which comprises a measuring chamber, said member including openings for connecting said ports with said chamber, a valve member mounted for rectilinear slidable movement in said longitudinal passage to vary the volume of said measuring chamber, a separate member engaging said valve member and movable in a direction transverse to the direction of movement of said valve member and manually operable in one direction to decrease the volume of said chamber, and means biasing said valve member to increase the volume of said chamber as said manually operable member is moved in an opposite direction.

2. In a device for measuring and dispensing flowing materials, a casing having an inlet port and a discharge port for inflow and discharge of the material, a measuring and dispensing member slidable in a passageway in said casing, said member having a longitudinally extending passage one end of which comprises a measuring chamber, said member including openings for connecting said ports with said chamber, a valve member mounted for rectilinear slidable movement in said longitudinal passage to vary the volume of said measuring chamber, a rectilinearly movable member having a cam surface engaging said valve to move it and manually operable in one direction to decrease the volume of said chamber, and means biasing said valve member to increase the volume of said chamber as said manually operable member is moved in an opposite direction, 3. In a device for measuring and dispensing flowing materials, a casing having an inlet port and a discharge port for inflow and discharge of the material, a measuring and dispensing member slidable in a passageway in said casing, said member having a longitudinally extending passage one end of which comprises a measuring chamber, said member including openings for connecting said ports with said chamber, a valve member mounted for rectilinear slidable movement in said longitudinal passage to vary the volume of said measuring chamber, said valve member having a cylindrical stem portion and a curved head, and a rectilinearly movable member having a cam surface engaging said valve head, and manually operable in one direction to decrease the volume of said chamber, and means biasing said valve member to increase the volume of said chamber as said manually operable member is moved in an opposite direction.

4. In a device for measuring and dispensing flowing materials, a casing having an inlet port and a discharge port for inflow and discharge of the material, a cylindrical measuring and dispensing member slidable in a passageway in said casing and having a slot at one end, said member having a longitudinally extending passage one end of which comprises a measuring chamber, said member including openings for connecting said ports with said chamber, a valve member mounted for rectilinear slidable movement in said longitudinal passage to vary the volume of said measuring chamber, a rectilinearly movable member slidable in said slot and engaging said valve member and manually operable in one direction to decrease the volume of said chamber, and means biasing said valve member to increase the volume of said chamber as said manually operable member is moved in an opposite direction.

5. A device as claimed in claim 4 having a member mounted on the slotted end of said dispensing member holding said rectilinearly movable member in said slot.

6. In a device for measuring and dispensing flowing materials, a casing having an inlet port and a discharge port for inflow and discharge of the material, a measuring and dispensing member slidable in a passageway in said casing, said member having a longitudinally extending passage one end of which comprises a measuring chamber, said member including openings for connecting said ports with said chamber, a valve member mounted for rectilinear slidable movement in said longitudinal passage to vary the volume of said measuring chamber, a rectilinearly movable member having a cam surface engaging said valve to move it and manually operable in a direction transverse to the direction of movement of said valve member for controlling the volume of said measuring chamber.

7. In a device for measuring and dispensing flowing materials, a casing having an inlet port and a discharge port for inflow and discharge of the material, a cylindrical measuring and dispensing member slidable in a passageway in said casing and having a slot at one end, said member having a longitudinally extending passage one end of which comprises a measuring chamber, said member including openings for connecting said ports with said chamber, a valve member mounted for rectilinear slidable movement in said longitudinal passage to vary the volume of said measuring chamber, rectilinearly slidable means movable relative to and engaging said valve member and manually operable in a direction transverse to the direction of movement of said valve member for controlling the volume of said measuring chamber.

8. A device as claimed in claim 7 having a member mounted on the slotted end of said dispensing member holding said rectilinearly movable member in said slot.

* * * * *